United States Patent
Yano et al.

(10) Patent No.: US 11,153,031 B2
(45) Date of Patent: Oct. 19, 2021

(54) WIRELESS BASE STATION DEVICE, WIRELESS TERMINAL DEVICE, WIRELESS COMMUNICATION SYSTEM, AND WIRELESS COMMUNICATION METHOD

(71) Applicant: FUJITSU LIMITED, Kawasaki (JP)

(72) Inventors: Tetsuya Yano, Yokohama (JP); Michiharu Nakamura, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/127,797

(22) Filed: Sep. 11, 2018

(65) Prior Publication Data
US 2019/0013893 A1 Jan. 10, 2019

Related U.S. Application Data

(63) Continuation of application No. PCT/JP2016/059717, filed on Mar. 25, 2016.

(51) Int. Cl.
*H04L 1/00* (2006.01)
*H04L 5/00* (2006.01)
(Continued)

(52) U.S. Cl.
CPC .......... *H04L 1/001* (2013.01); *H04L 1/0003* (2013.01); *H04L 1/0025* (2013.01); *H04L 5/0053* (2013.01); *H04W 72/042* (2013.01); *H04W 72/0406* (2013.01); *H04L 5/14* (2013.01); *H04W 88/08* (2013.01)

(58) Field of Classification Search
CPC ......... H04L 1/001; H04L 1/0003; H04L 5/14; H04L 1/0025; H04L 5/0053; H04W 72/0406; H04W 88/08; H04W 72/042
See application file for complete search history.

(56) References Cited

U.S. PATENT DOCUMENTS

2011/0032894 A1 2/2011 Miki et al.
2016/0087762 A1 3/2016 Eriksson et al.

FOREIGN PATENT DOCUMENTS

JP 2009-212597 A 9/2009
JP 2013-62848 A 4/2013

OTHER PUBLICATIONS

International Search Report issued by the Japan Patent Office for corresponding International Patent Application No. PCT/JP2016/059717, dated May 31, 2016, with an English translation.

(Continued)

*Primary Examiner* — Jackie Zuniga Abad
(74) *Attorney, Agent, or Firm* — Myers Wolin, LLC

(57) ABSTRACT

A base station device includes: a memory; and a processor coupled to the memory and configured to execute a first generation processing that includes generating a first control channel to be placed in a sub-frame at a predetermined cycle, the first control channel including designation information indicating at least one sub-frame in the predetermined cycle, execute a second generation processing that includes generating a second control channel to be placed in a sub-frame indicated by the designation information in the first control channel, the second control channel including control information for controlling communication, and execute a transmission processing that includes transmitting a sub-frame in which the first control channel is placed and a sub-frame in which the second control channel is placed.

11 Claims, 14 Drawing Sheets

(51) Int. Cl.
  *H04W 72/04*    (2009.01)
  *H04W 88/08*    (2009.01)
  *H04L 5/14*     (2006.01)

(56) References Cited

OTHER PUBLICATIONS

Written Opinion of the International Searching Authority issued by the Japan Patent Office for corresponding International Patent Application No. PCT/JP2016/059717, dated May 31, 2016, with a partial English translation.
Notification of Reasons for Refusal issued by the Japan Patent Office for corresponding Japanese Patent Application No. 2018-506738, dated Apr. 9, 2019, with an English translation.

WIRELESS BASE STATION DEVICE, WIRELESS TERMINAL DEVICE, WIRELESS COMMUNICATION SYSTEM, AND WIRELESS COMMUNICATION METHOD

CROSS-REFERENCE TO RELATED APPLICATION

This application is a continuation application of International Application PCT/JP2016/059717 filed on Mar. 25, 2016 and designated the U.S., the entire contents of which are incorporated herein by reference.

FIELD

The embodiments discussed herein are related to a base station device, a terminal device, a wireless communication system, and a wireless communication method.

BACKGROUND

In recent years, for the purpose of achieving higher speed, larger capacity, mass-connection, higher reliability, and reduced delay in wireless communication in wireless communication systems such as a mobile communication system (cellar system), next-generation wireless communication techniques have been discussed. For this reason, in the 3rd Generation Partnership Project (3GPP) that is a standardization project that formulates specifications of the mobile communication system, the formulation of specifications of the 5th-generation mobile communication system has started. Specifically, for example, in the release 14 of the 3GPP (Release14), the reduction of the transmission time interval (TTI) such as sub-frame has been examined. That is, in the long-term evolution (LTE) and the LTE advanced (LTE-A), it has been examined to shorten the length of the sub-frame from 1 ms (millisecond) to 0.5 ms to 70 μs (microseconds).

Even when the TTI is shortened in this manner, the volume of control information including communication parameters does not change. Accordingly, the ratio of the control information included in one TTI increases, increasing the overhead of a control channel. The increase in the overhead reduces the ratio of user information included in one TTI, hindering an improvement of the communication efficiency.

Thus, to suppress the increase in the overhead, a portion of the control information may be transmitted at a long cycle. For example, an ACK/NACK that is a reception confirmation response of a signal is transmitted in every sub-frame, while scheduling information is transmitted once in two sub-frames, to suppress the increase in the overhead.

Examples of the related art include Japanese Laid-open Patent Publication No. 2009-212597.

SUMMARY

According to an aspect of the invention, a base station device includes: a memory; and a processor coupled to the memory and configured to execute a first generation processing that includes generating a first control channel to be placed in a sub-frame at a predetermined cycle, the first control channel including designation information indicating at least one sub-frame in the predetermined cycle, execute a second generation processing that includes generating a second control channel to be placed in a sub-frame indicated by the designation information in the first control channel, the second control channel including control information for controlling communication, and execute a transmission processing that includes transmitting a sub-frame in which the first control channel is placed and a sub-frame in which the second control channel is placed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The above-mentioned conventional technique has a problem that it is difficult to optimally set the communication according to time-varying wireless communication situations. That is, in the wireless communication system, since the terminal device is movable, the traffic volume of the base station device and the quality of a transmission path change with time. Despite of it, when a portion of the control information is transmitted at a long cycle, communication parameters may not be flexibly changed depending on situations, leading to a decrease in throughput or communication efficiency.

An aspect of this disclosure provides the technique of flexibly setting the communication in the wireless communication system according to situations while suppressing the overhead.

Embodiments of a base station device, a terminal device, a wireless communication system, and a wireless communication method according to the present disclosure will be described below. The present disclosure is not limited to the embodiments.

Embodiment 1

Figure 1:
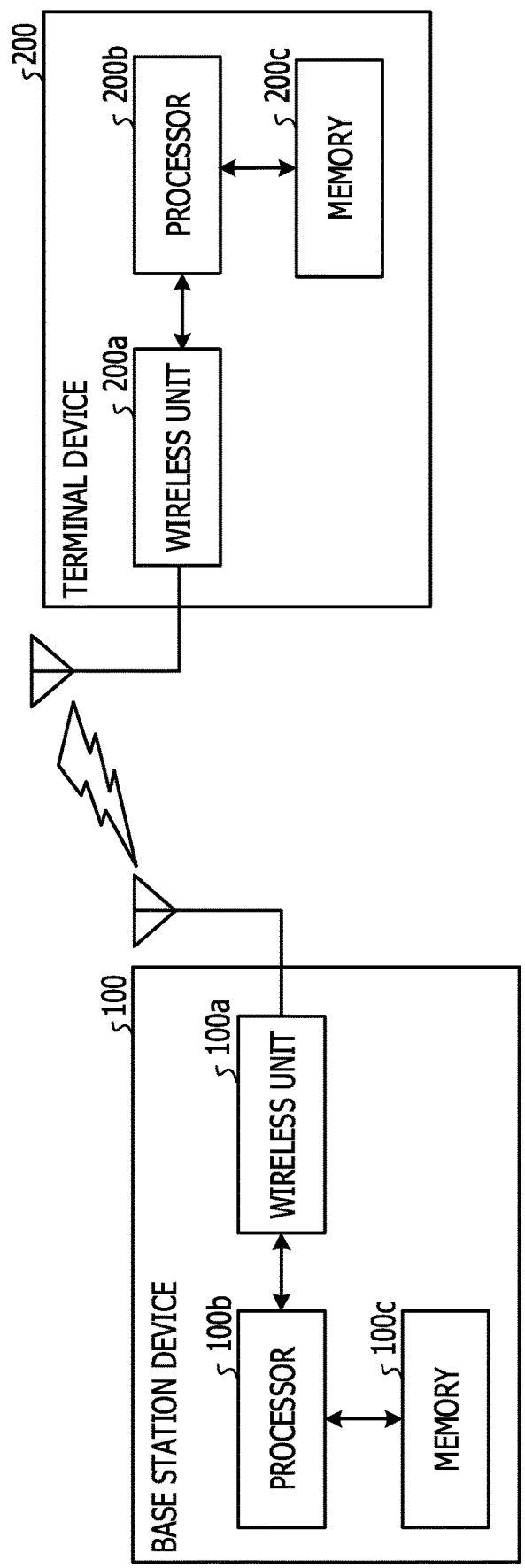
FIG. 1 is a view illustrating a configuration of a wireless communication system according to Embodiment 1.

FIG. 1 is a view illustrating a configuration of a wireless communication system according to Embodiment 1. As illustrated in FIG. 1, the wireless communication system has a base station device 100 and a terminal device 200. The base station device 100 and the terminal device 200 wirelessly communicate with each other. Hereinafter, a signal transmitted from the base station device 100 to the terminal device 200 is referred to as down signal, and a signal transmitted from the terminal device 200 to the base station device 100 is referred to as up signal.

The base station device 100 has a wireless unit 100a, a processor 100b, and a memory 100c. The wireless unit 100a applies predetermined wireless transmission processing to the down signal outputted from the processor 100b, and transmits the processed signal via an antenna. The wireless unit 100a receives the up signal via the antenna, and applies predetermined wireless reception processing to the up signal.

The processor 100b includes, for example, a central processing unit (CPU), a field programmable gate array (FPGA), or a digital signal processor (DSP), and controls the whole base station device 100. That is, the processor 100b encodes and modulates transmit data to generate a data channel of the down signal, and outputs the data channel to the wireless unit 100a. The processor 100b encodes and modulates the control information to generate a control channel of the down signal, and outputs the control channel to the wireless unit 100a. Further, the processor 100b demodulates and decodes the data channel of the up signal inputted from the wireless unit 100a, and acquires receive data.

The memory 100c includes, for example, a random access memory (RAM) or a read only memory (ROM), and stores various data when the processor 100b executes processing. A configuration of the base station device 100 will be described later in detail.

The terminal device 200 has a wireless unit 200a, a processor 200b, and a memory 200c. The wireless unit 200a receives the down signal via an antenna, and applies predetermined wireless reception processing to the down signal. The wireless unit 200a applies predetermined wireless transmission processing to the up signal outputted from the processor 200b, and transmits the processed signal via an antenna.

The processor 200b includes, for example, CPU, FPGA, or DSP, and controls the whole terminal device 200. That is, the processor 200b demodulates and decodes the control channel of the down signal inputted from the wireless unit 200a, and acquires control information. Then, the processor 200b demodulates and decodes the data channel of the down signal inputted from the wireless unit 200a using the control information, and acquires the receive data. The processor 200b encodes and modulates the transmit data to generate the data channel of the up signal, and outputs the data channel to the wireless unit 200a.

The memory 200c includes, for example, a RAM or a ROM, and stores various information when the processor 200b executes processing. A configuration of the terminal device 200 will be described later in detail.

Figure 2:
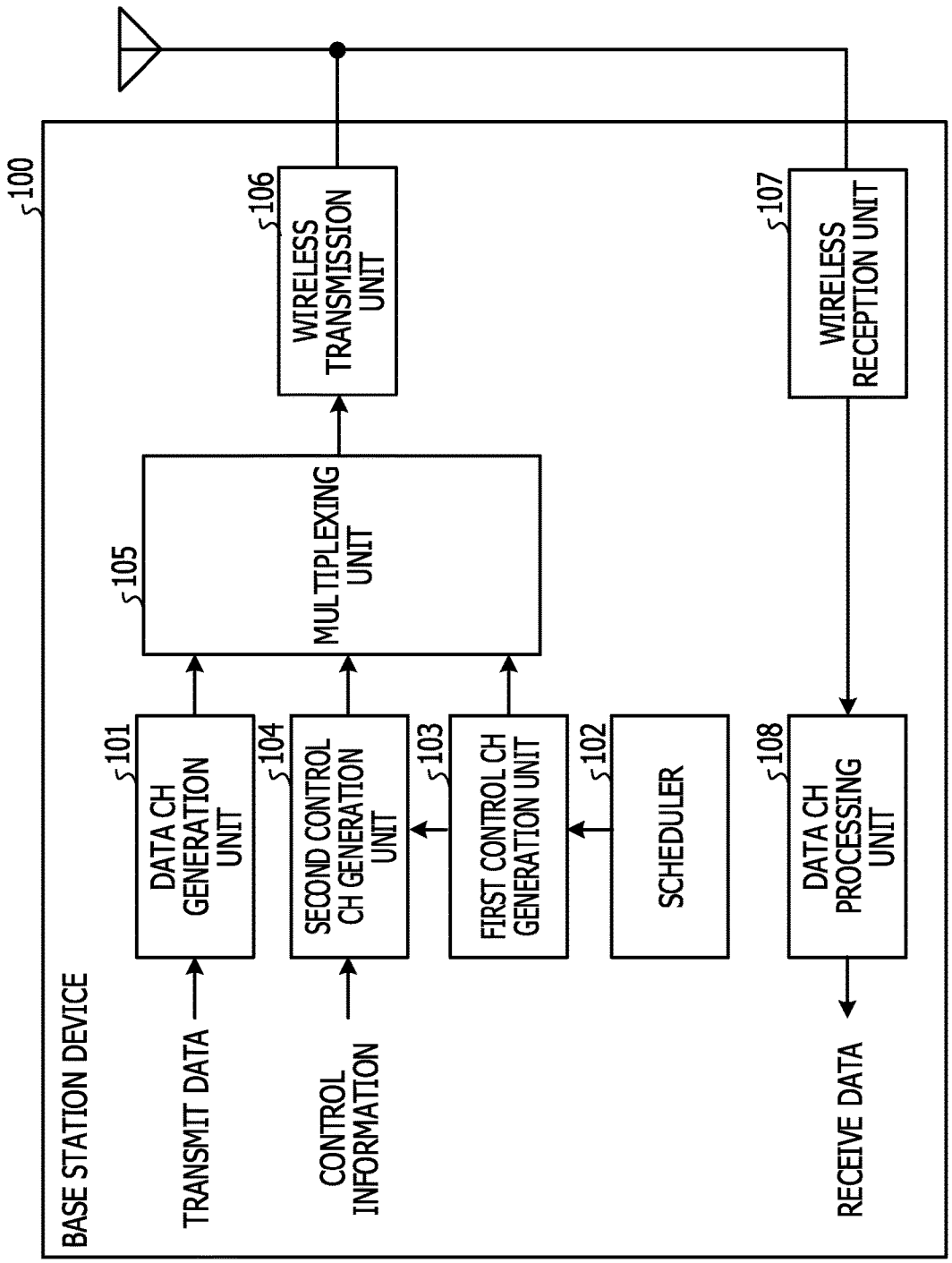
FIG. 2 is a block diagram illustrating a configuration of a base station device according to Embodiment 1.

FIG. 2 is a block diagram illustrating a configuration of the base station device 100 according to Embodiment 1. The base station device 100 illustrated in FIG. 2 has a data channel generation unit (hereinafter abbreviated as "data CH generation unit") 101, a scheduler 102, a first control channel generation unit (hereinafter abbreviated referred to as "first control CH generation unit") 103, a second control channel generation unit (hereinafter abbreviated as "second control CH generation unit") 104, a multiplexing unit 105, a wireless transmission unit 106, a wireless reception unit 107, and a data channel processing unit (hereinafter abbreviated as "data CH processing unit") 108.

The wireless transmission unit 106 and the wireless reception unit 107 correspond to the wireless unit 100a illustrated in FIG. 1, and other processing units correspond to the processor 100b illustrated in FIG. 1. Hereinafter, the wireless communication mainly between the base station device 100 and the terminal device 200 will be described. However, the base station device 100 wirelessly communicates with terminal devices other than the terminal device 200 in the same manner.

The data CH generation unit 101 encodes and modulates transmit data to generate the data channel of the down signal destined to the terminal device 200. That is, the data CH generation unit 101 places the transmit data for the terminal device 200 in a resource block corresponding to the terminal device 200 in the sub-frame of the down signal.

The scheduler 102 performs down scheduling for determining the transmission timing, the wireless resource assignment, the modulation and coding scheme of the down signal to a plurality of terminal devices including the terminal device 200. The scheduler 102 performs up scheduling for determining the transmission timing, the wireless resource assignment, the modulation and coding scheme of the up signal from a plurality of terminal devices. Then, the scheduler 102 notifies a scheduling result to the first control CH generation unit 103 and the second control CH generation unit 104.

The first control CH generation unit 103 identifies a sub-frame in which the control information destined to the terminal device 200 is transmitted, based on the scheduling result, and generates the first control channel including information designating the identified sub-frame. That is, the first control CH generation unit 103 identifies the sub-frame corresponding to the transmission timing of the down signal to the terminal device 200, and determines that the identified sub-frame is the sub-frame in which the control information destined to the terminal device 200 is transmitted. Then, the first control CH generation unit 103 places the identification information of the sub-frame in which the control information destined to the terminal device 200 is transmitted, in the resource block for the first control channel periodically provided at every predetermined number of sub-frames.

The first control CH generation unit 103 may determine whether the control information destined to the terminal device 200 is control information on down link (hereinafter referred to as "down control information") or control information on up link (hereinafter referred to as "up control information") to generate the first control channel. That is, the first control CH generation unit 103 may distinguish the sub-frame including the down control information from the sub-frame including the up control information to place the identification information of the sub-frame in the first control channel. The cycle of the sub-frame assigned to the first control channel may be different depending on different terminal devices, and be notified to each terminal device, for example, by radio resource control (RRC) signaling used to control wireless resources.

The second control CH generation unit 104 encodes and modulates the control information to generate the second control channel destined to the terminal device 200. At this time, the second control CH generation unit 104 assigns the second control channel to the sub-frame whose identification information is notified to the terminal device 200 by the first control channel. That is, the second control CH generation unit 104 places the down control information including, for example, information on the modulation and coding scheme of the data channel destined to the terminal device 200 in the resource block for the second control channel of the sub-frame whose identification information is represented by the first control channel. The down control information placed in the second control channel may include information indicating the resource block in which the data channel assigned to the terminal device 200, or information indicating whether the transmit data included in the data channel is newly transmitted or retransmitted.

The second control CH generation unit 104 places the up control information including parameters used to transmit the up data channel by the terminal device 200, in the resource block for the second control channel. At this time, the second control CH generation unit 104 places the up control information in the sub-frame designated by the first control channel as the sub-frame including the up control information.

The multiplexing unit 105 multiplexes the data channel, the first control channel, and the second control channel that are generated by the data CH generation unit 101, the first control CH generation unit 103, and the second control CH generation unit 104 to generate the down signal.

The wireless transmission unit 106 applies wireless transmission processing such as digital/analog (D/A) conversion and up conversion to the down signal generated by the multiplexing unit 105, and transmits the processed signal via an antenna.

The wireless reception unit 107 receives the up signal via the antenna, and applies wireless reception processing such as down conversion and analog/digital (A/D) conversion to the up signal.

The data CH processing unit 108 demodulates and decodes the up signal to acquire the receive data from the data channel of the up signal.

Figure 3:
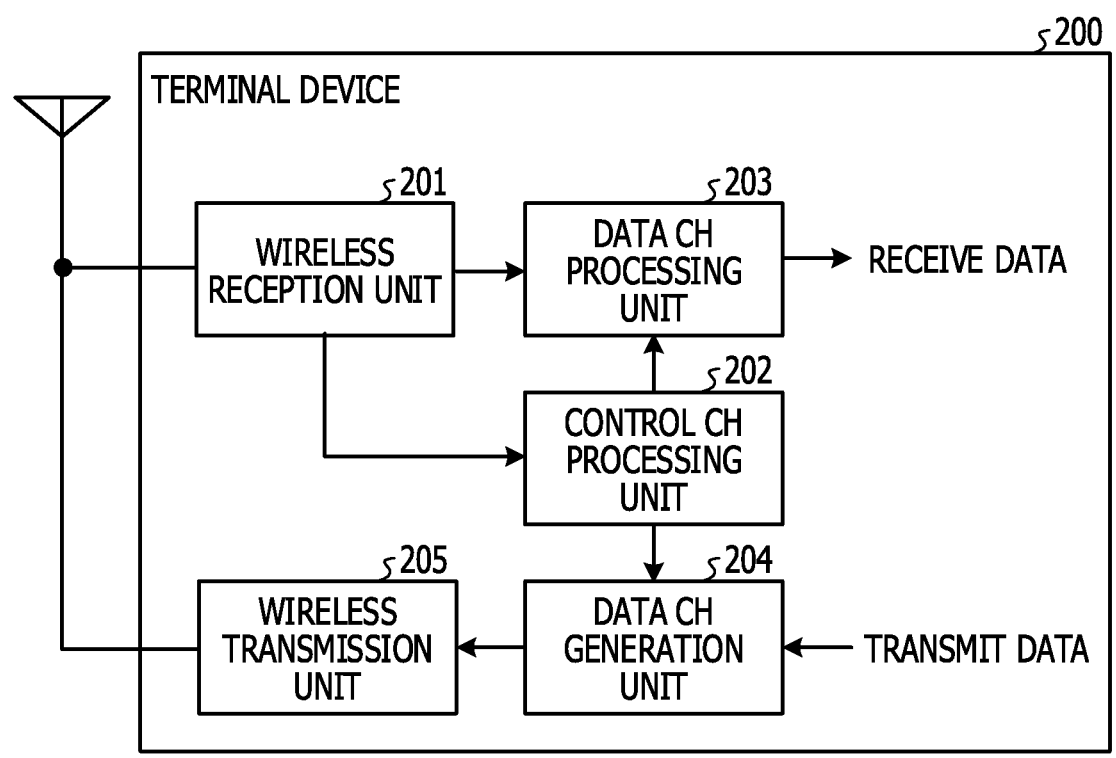
FIG. 3 is a block diagram illustrating a configuration of a terminal device according to Embodiment 1.

FIG. 3 is a block diagram illustrating a configuration of the terminal device 200 according to Embodiment 1. The terminal device 200 illustrated in FIG. 3 has a wireless reception unit 201, a control channel processing unit (hereinafter abbreviated as "control CH processing unit") 202, a data channel processing unit (hereinafter abbreviated to as "data CH processing unit") 203, a data channel generation unit (hereinafter abbreviated as "data CH generation unit") 204, and a wireless transmission unit 205.

The wireless reception unit 201 and the wireless transmission unit 205 correspond to the wireless unit 200*a* illustrated in FIG. 1, and other processing units correspond to the processor 200*b* illustrated in FIG. 1.

The wireless reception unit 201 receives the down signal via an antenna, and applies wireless reception processing such as down conversion and A/D conversion of the down signal.

The control CH processing unit 202 demodulates and decodes the down signal, to acquire the identification information of the sub-frame including the second control channel, from the first control channel of the predetermined sub-frame previously notified. Then, the control CH processing unit 202 acquires the down control information and the up control information from the second control channel of the sub-frame corresponding to the acquired identification information.

Since the identification information of the sub-frame including the second control channel is notified by the first control channel, the control CH processing unit 202 does not have to monitor all sub-frames to acquire the control information. That is, the control CH processing unit 202 may monitor only the sub-frame whose identification information is notified by the first control channel to acquire the control information destined to the terminal device 200, thereby reducing a load of the reception processing.

The data CH processing unit 203 demodulates and decode a down data channel using the down control information acquired from the second control channel, to acquire the receive data from the data channel destined to the terminal device 200.

The data CH generation unit 204 encodes and modulates the transmit data using the up control information acquired from the second control channel to generate the up data channel. That is, the data CH generation unit 204 places the up data channel in the resource block in the sub-frame designated by the up control information included in the second control channel.

The wireless transmission unit 205 applies wireless transmission processing such as D/A conversion and up conversion to the up signal including the data channel generated by the data CH generation unit 204, and transmits the processed signal via an antenna.

Figure 4:
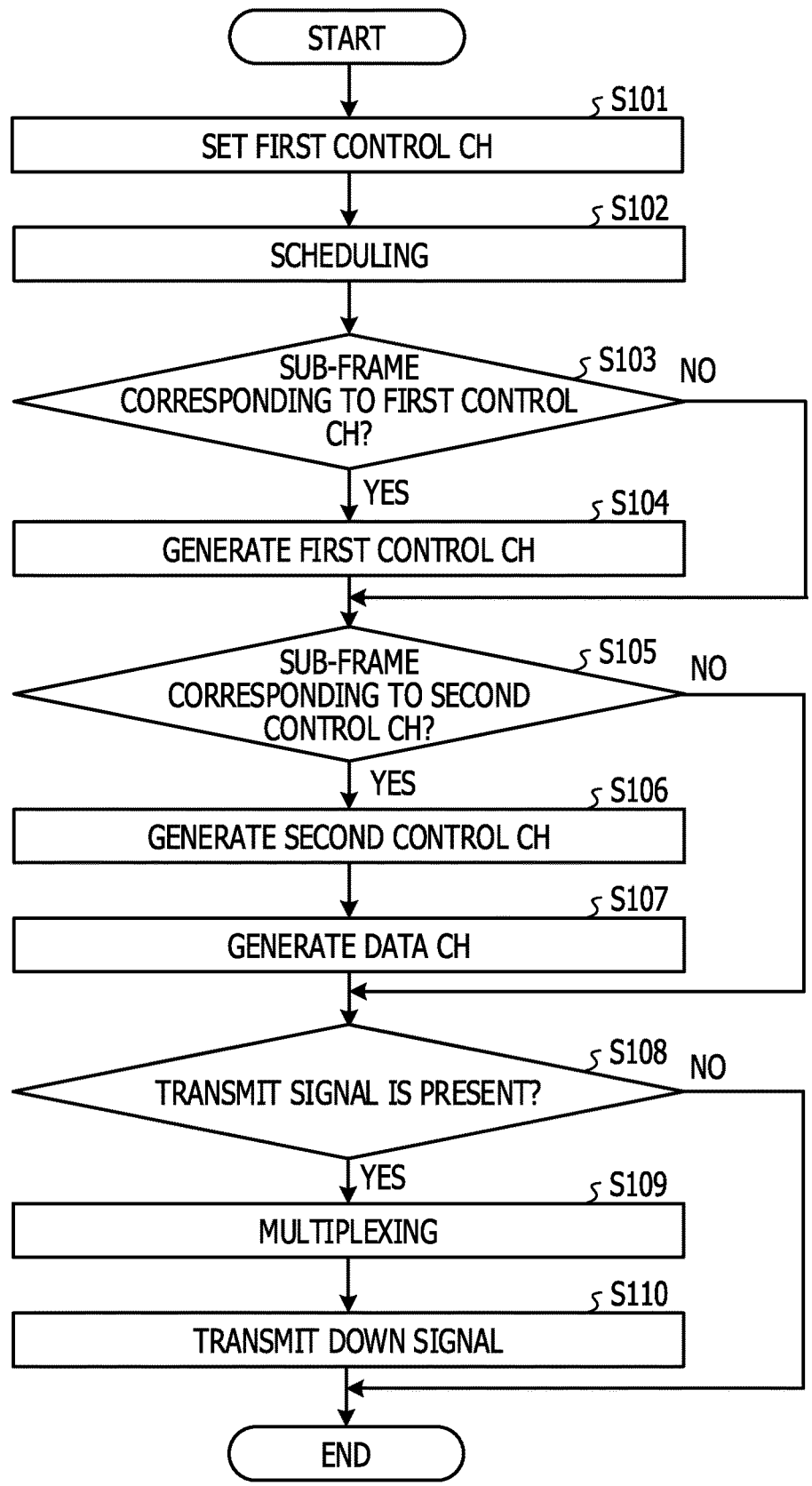
FIG. 4 is a flow chart illustrating control information transmission processing on down data according to Embodiment 1.

Next, referring to a flow chart in FIG. 4, transmission processing of the down control information by the base station device 100 thus configured will be described.

When the base station device 100 starts to communicate with the terminal device 200, a cycle to transmit the first control channel is set (Step S101), and the setting about the first control channel is notified to the terminal device 200, for example, by the RRC signaling. The setting about the first control channel may be appropriately changed based on the traffic volume of the base station device 100 and the moving speed of the terminal device 200.

In the base station device 100, the scheduler 102 performs scheduling of assigning wireless resources for the down link and the up link to a plurality of terminal devices including the terminal device 200 (Step S102). The transmission timing of the down signal destined to each terminal device and the transmission timing of the up signal from each terminal device are determined by the scheduling. The scheduling results are notified from the scheduler 102 to the first control CH generation unit 103.

Then, the first control CH generation unit 103 determines whether or not the sub-frame corresponding to a preset transmission cycle of the first control channel arrives (Step S103). When it is determined that the sub-frame corresponding to the transmission cycle of the first control channel arrives (Yes in Step S103), the first control CH generation unit 103 identifies the sub-frame in which the control information destined to the terminal device 200 is transmitted, from the scheduling results. That is, for example, the sub-frame determined at the transmission timing of the down signal destined to the terminal device 200 is identified as the sub-frame in which the control information destined to the terminal device 200 is transmitted.

Then, the first control CH generation unit 103 generates the first control channel including the identified identification information of the sub-frame (Step S104). On the contrary, when it is determined in Step S103 that the sub-frame corresponding to the transmission cycle of the first control channel does not arrive (No in Step S103), the first control channel is not generated.

Then, the second control CH generation unit 104 determines whether or not the sub-frame corresponding to the identification information included in the first control channel that is transmitted in the current sub-frame or has been already transmitted arrives (Step S105). In other words, the second control CH generation unit 104 determines whether or not the sub-frame in which the control information destined to the terminal device 200 is transmitted arrives. When it is determined that the sub-frame in which the control information destined to the terminal device 200 is transmitted (Yes in Step S105), the second control CH generation unit 104 encodes and modulates the control information destined to the terminal device 200 to generate the second control channel (Step S106). The data CH generation unit 101 encodes and modulates the transmit data destined to the terminal device 200 to generate the down data channel (Step S107). Here, the control information included in the second control channel is information used to demodulate and decode the down data channel. That is, the second control channel includes the down control information.

Through the above-mentioned processing, when the sub-frame in which the first control channel, the second control channel, or the data channel is transmitted arrives, a transmit signal including the channel is generated. That is, the multiplexing unit 105 determines whether or not the channel to be transmitted is generated (Step S108), and when it is determined that any one of the channels is not generated (No in Step S108), since it is not the transmission timing for both of the first control channel and the second control channel, the control information is not generated. On the contrary, when any one of the channels is generated (Yes in Step S108), at least one of the generated first control channel, second control channel, and data channel is time-multiplexed and frequency-multiplexed by the multiplexing unit 105 (Step S109) to generate the down signal. Then, the wireless transmission unit 106 transmits the down signal including the sub-frame in which at least one of the first control channel, the second control channel, and the data channel is placed, via an antenna (Step S110).

Figure 5:
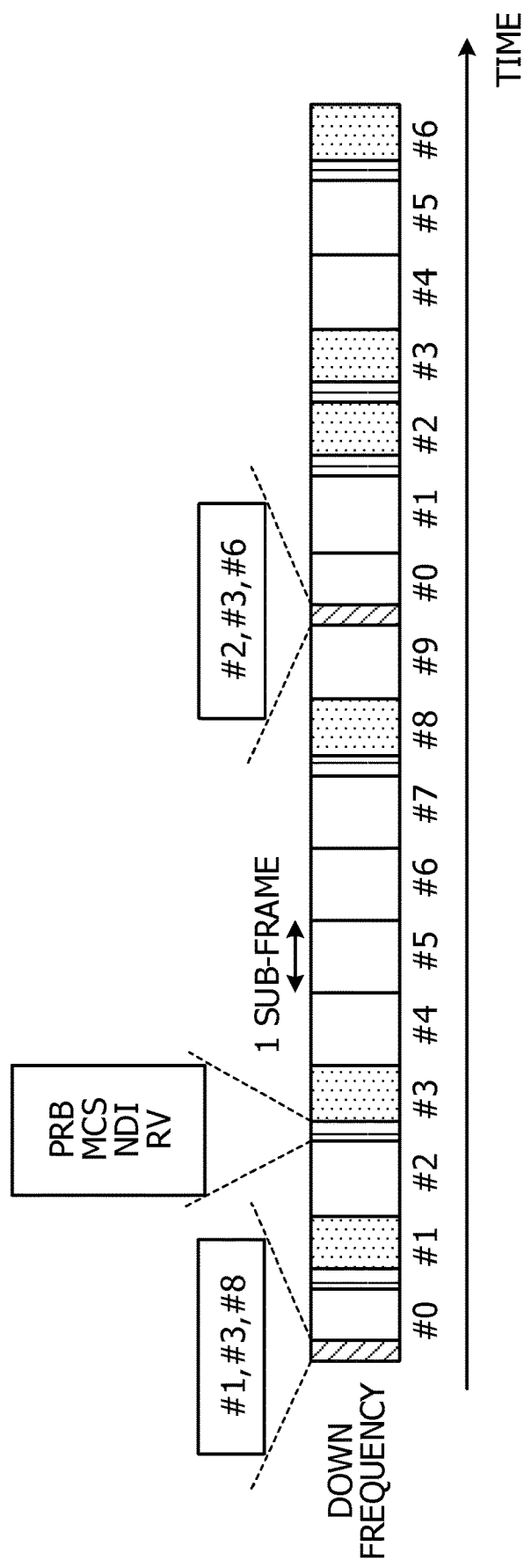
FIG. 5 is a view illustrating a specific example of a configuration of sub-frames in the frequency division duplex (FDD)

Next, a specific example of a configuration of the sub-frame at the transmission of the down control information will be described. FIG. 5 is a view illustrating the specific example of the configuration of the sub-frames in the case of the frequency division duplex (FDD). In the FDD, different frequency bands are used depending on the down link and the up link. FIG. 5 illustrates the configuration of the sub-frames for the down link.

As illustrated in FIG. 5, for example, the first control channel is transmitted in the sub-frame #0 at a cycle of 10 sub-frames. That is, the resource block represented by an oblique-line pattern, which is the sub-frame #0 in FIG. 5, is assigned to the first control channel. The first control channel includes the identification information of the sub-frame in which the second control channel including the down control information is transmitted.

The identification information of the sub-frame, which is included in the first control channel is determined, by the scheduling in the base station device 100. For example, when the scheduling determines that the control information destined to the terminal device 200 is transmitted in the sub-frames #1, #3, and #8, the identification information of the sub-frames #1, #3, and #8 is notified to the terminal device 200 by the first control channel. Similarly, according to the scheduling at the transmission of the next first control channel, when it is determined that the control information destined to the terminal device 200 is transmitted in the sub-frames #2, #3, and #6, the identification information of the sub-frames #2, #3, and #6 is notified by the first control channel.

Then, the second control channel and data channel destined to the terminal device 200 are assigned to the sub-frames notified to the terminal device 200 by the first control channel. In FIG. 5, the second control channel is represented by a horizontal-line pattern, and the data channel is represented as a dot pattern. The second control channel includes control information such as communication parameters used to demodulate and decode the data channel.

The control information included in the second control channel may include information on the physical resource block (PRB) to which the data channel destined to the terminal device 200 is assigned, and information on the modulation and coding scheme (MCS) of the data channel. The control information included in the second control channel may include information for identifying new data and retransmit data (NDI: New Data Indicator) and information on redundancy at encoding (RV: Redundancy Version).

Figure 6:
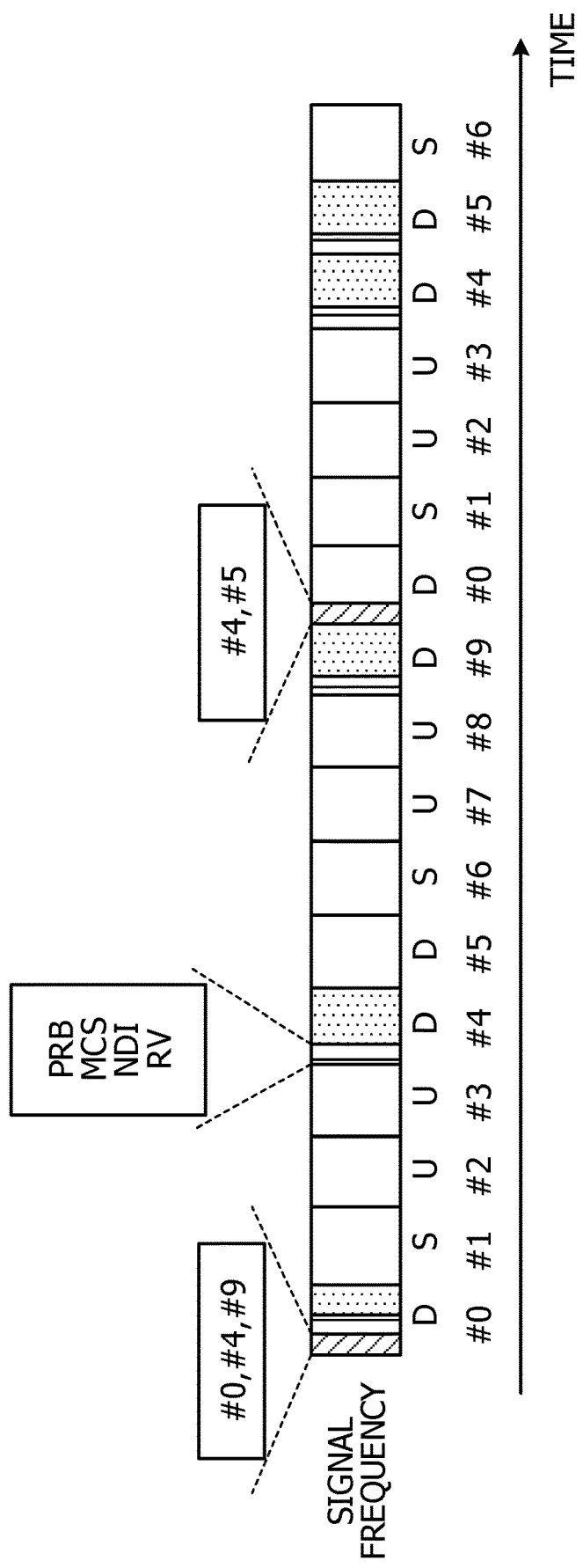
FIG. 6 is a view illustrating another specific example of a configuration of sub-frames in the time division duplex (TDD)

FIG. 6 is a view illustrating a specific example of a configuration of the sub-frames in the time division duplex (TDD). In the TDD, the same frequency band is used in both of the down link and the up link and however, the sub-frames are divided into sub-frames of the down link and sub-frames in the up link. In FIG. 6, "D" represents the sub-frame in the down link, and "U" represents the sub-frame in the up link. The sub-frame represented by "S" is a sub-frame that is a boundary between the sub-frame in the down link and the sub-frame in the up link, and includes both of transmission time of the down link and transmission time of the up link.

As illustrated in FIG. 6, also when the TDD is employed, the first control channel is transmitted in the sub-frame #0 in the down link at a cycle of 10 sub-frames. That is, the resource block represented by an oblique-line pattern, which is the sub-frame #0 in FIG. 6, is assigned to the first control channel. The first control channel includes the identification information of the sub-frame in the down link to which the second control channel including the down control information is transmitted.

The identification information of the sub-frame, which is included in the first control channel, is determined by the scheduling in the base station device 100. For example, when the scheduling determines that the control information destined to the terminal device 200 is transmitted in the sub-frames #0, #4, and #9 in the down link, the identification information of the sub-frames #0, #4, and #9 is notified to the terminal device 200 by the first control channel. Similarly, according to the scheduling at the transmission of the next first control channel, for example, when it is determined that the control information destined to the terminal device 200 is transmitted in the sub-frames #4 and #5 in the down link, the identification information of the sub-frames #4 and #5 is notified by the first control channel. In the case of employing the TDD, since the control information is transmitted in the sub-frame in the down link, the identification information of the sub-frames notified in the first control channel become the identification information of the sub-frame of the down link. Since the sub-frame #0 including the first control channel is also the sub-frame in the down link, the second control channel may be assigned to the sub-frame #0.

Then, the second control channel and data channel destined to the terminal device 200 are assigned to the sub-frame in the down link, which is notified to the terminal device 200 by the first control channel. In FIG. 6, the second control channel is represented by a horizontal-line pattern, and the data channel is represented by a dot pattern. The second control channel includes control information such as communication parameters used to demodulate and decode the data channel. That is, as in the case of employing the FDD, PRB, MCS, NDI, and RV are included in the second control channel.

Figure 7:
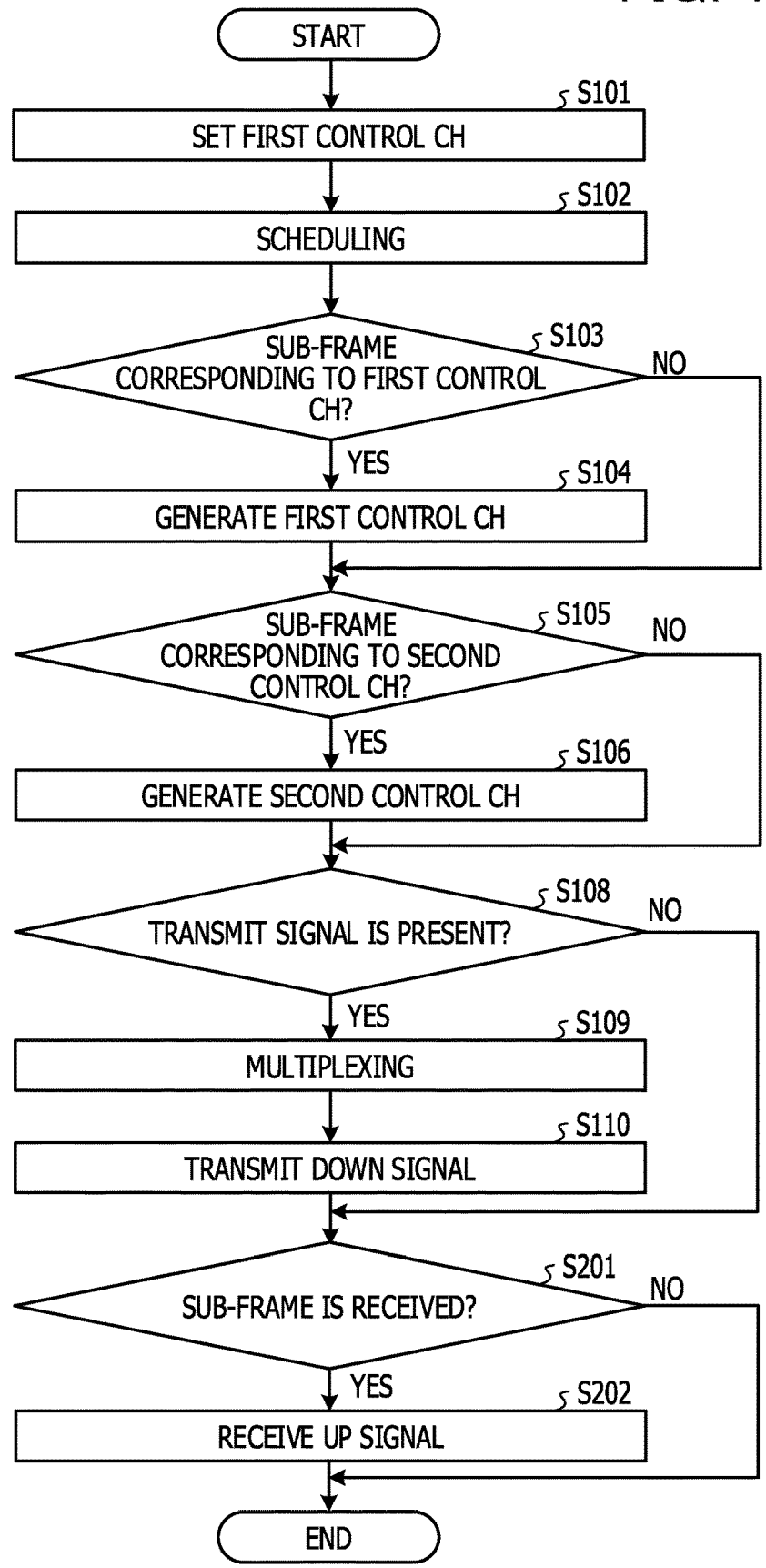
FIG. 7 is a flow chart illustrating control information transmission processing on up data according to Embodiment 1.

Next, referring to a flow chart in FIG. 7, transmission processing of the up control information by the base station device 100 will be described. The same elements in FIG. 7 as those in FIG. 4 are given the same reference numerals, and detailed description thereof is omitted.

When the base station device 100 starts to communicate with the terminal device 200, a transmission cycle of the first control channel is set (Step S101), and the setting about the first control channel is notified to the terminal device 200, for example, by the RRC signaling. In the base station device 100, the scheduler 102 performs scheduling that assigns wireless resources for the down link and the up link to a plurality of terminal devices including the terminal device 200 (Step S102).

Then, the first control CH generation unit 103 determines whether or not the sub-frame corresponding to the preset transmission cycle of the first control channel arrives (Step S103). When it is determined that the sub-frame corresponding to the transmission cycle of the first control channel arrives (Yes in Step S103), the first control CH generation unit 103 identifies the sub-frame in which the control information destined to the terminal device 200 is transmitted, from the scheduling results. Then, the first control CH generation unit 103 generates the first control channel including the identified identification information of the sub-frame (Step S104). On the contrary, when it is determined in Step S103 that the sub-frame corresponding to the transmission cycle of the first control channel does not arrive (No in Step S103), the first control channel is not generated.

Then, the second control CH generation unit 104 determines whether or not the sub-frame corresponding to the identification information included in the first control channel that is transmitted in the current sub-frame or has been transmitted arrives (Step S105). In other words, the second control CH generation unit 104 determines whether or not the sub-frame in which the control information destined to the terminal device 200 is transmitted arrives. When it is determined that the sub-frame in which the control information destined to the terminal device 200 is transmitted arrives (Yes in Step S105), the second control CH generation unit 104 encodes and modulates the control information destined to the terminal device 200 to generate the second control channel (Step S106). Here, the control information included in the second control channel is information used to encode and modulate the up data channel. That is, the second control channel includes the up control information.

Through the above-mentioned processing, when the sub-frame in which the first control channel or the second control channel is transmitted arrives, the transmit signal including the channel is generated. That is, the multiplexing unit 105 determines whether or not the channel to be transmitted is generated (Step S108), and when any one of the channels is not generated (No in Step S108), since it is not the transmission timing for both of the first control channel and the second control channel, the control information is not transmitted. On the contrary, when any one of the channels is generated (Yes in Step S108), at least one of the generated first control channel and second control channel is time-multiplexed and frequency-multiplexed by the multiplexing unit 105 (Step S109) to generate the down signal. Then, the wireless transmission unit 106 transmits the down signal including the sub-frame in which at least one of the first control channel and the second control channel is placed, via an antenna (Step S110).

It is determined whether or not the sub-frame in which the up signal is transmitted from the terminal device 200 according to the control information included in the already transmitted second control channel arrives (Step S201), and when it is determined the sub-frame arrives (Yes in Step S201), the up signal is received by the wireless reception unit 107 (Step S202).

Figure 8:
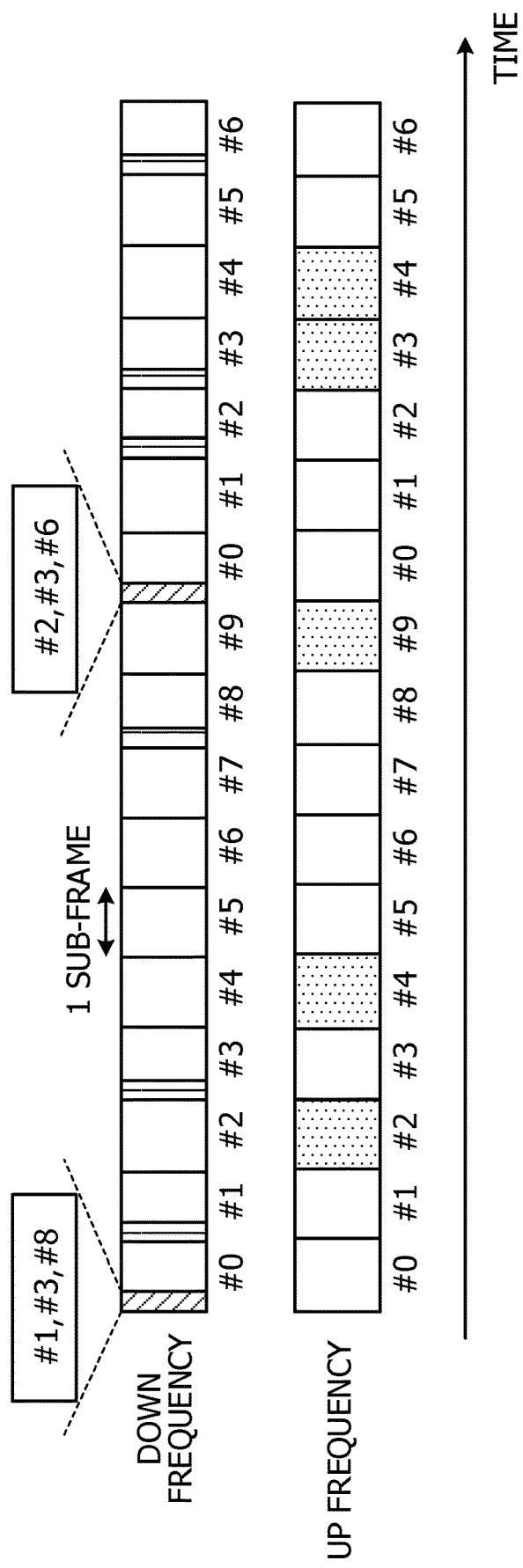
FIG. 8 is a view illustrating a specific example of a configuration of sub-frames in the FDD.

Next, a specific example of a configuration of the sub-frame at the transmission of the up control information will be described. FIG. 8 is a view illustrating the specific example of the configuration of the sub-frame in the case of the FDD. In the FDD, different frequency bands are used depending on the down link and the up link.

As illustrated in FIG. 8, for example, the first control channel is transmitted in the sub-frame #0 of down frequency at a cycle of 10 sub-frames. That is, the resource block represented by an oblique-line pattern in the sub-frame #0 in FIG. 8 is assigned to the first control channel. The first control channel includes the identification information of the sub-frame in which the second control channel including the up control information is transmitted.

The identification information of the sub-frame, which is included in the first control channel, is determined by the scheduling in the base station device 100. For example, when the scheduling determines that the transmission of the up signal from the terminal device 200 in the sub-frames #2, #4, and #9 in the down frequency is allowed, it is determined that the up control information is notified in the sub-frames preceding the sub-frames #2, #4, and #9 by a predetermined number. Here, given that the control information is notified in the immediately preceding sub-frame, the identification information of the sub-frames #1, #3, and #8 is notified to the terminal device 200 by the first control channel. Similarly, according to the scheduling at the transmission of the next first control channel, for example, when it is determined that the control information destined to the terminal device 200 is transmitted in the sub-frames #2, #3, and #6, the identification information of the sub-frames #2, #3, and #6 is notified by the first control channel.

Then, the second control channel destined to the terminal device 200 is assigned to the sub-frame notified to the terminal device 200 by the first control channel. In FIG. 8, the second control channel is represented by a horizontal-line pattern. The second control channel includes control information such as communication parameters used to encode and modulate the data channel in the up link.

The control information included in the second control channel may include information on the PRB to which the data channel from the terminal device 200 is assigned. When receiving the second control channel, the terminal device 200 recognizes that transmission of the up data channel is allowed, and transmits the up data channel in the sub-frame of up frequency following the sub-frame including the second control channel by a predetermined number. In FIG.

8, as represented by a dot pattern, the up data channel is transmitted in the immediately subsequent sub-frame of the second control channel.

Figure 9:
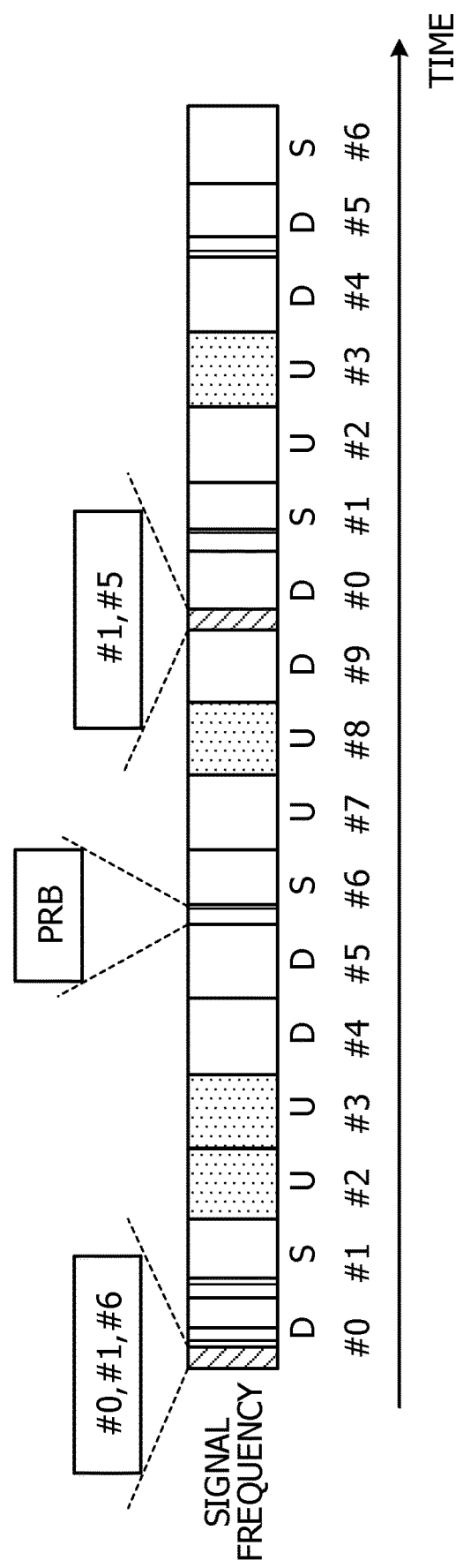
FIG. 9 is a view illustrating a specific example of a configuration of sub-frames in the TDD.

FIG. 9 is a view illustrating a specific example of a configuration of the sub-frames in the TDD. In the TDD, the same frequency band is used in both of the down link and the up link and however, the sub-frames are divided into sub-frames of the down link and sub-frames in the up link. In FIG. 9, "D" represents the sub-frame in the down link, and "U" represents the sub-frame in the up link. The sub-frame represented by "S" is a sub-frame that is a boundary between the sub-frame in the down link and the sub-frame in the up link, and includes both of transmission time of the down link and transmission time of the up link.

As illustrated in FIG. 9, also when the TDD is employed, the first control channel is transmitted in the sub-frame #0 in the down link at a cycle of 10 sub-frames. That is, the resource block represented by an oblique-line pattern, which is the sub-frame #0 in FIG. 9, is assigned to the first control channel. The first control channel includes the identification information of the sub-frame in the down link, to which the second control channel including the up control information is transmitted.

The identification information of the sub-frame, which is included in the first control channel, is determined by the scheduling in the base station device 100. For example, when the scheduling determines that transmission of the up signal from the terminal device 200 in the sub-frames #2, #3, and #8 of the up link is allowed, it is determined that the up control information is notified in the sub-frames preceding the sub-frames #2, #3, and #8 by a predetermined number of sub-frames. Here, given that the control information is notified in the preceding sub-frames by two sub-frames, the identification information of the sub-frames #0, #1, and #6 is notified to the terminal device 200 by the first control channel. Similarly, according to the scheduling at the transmission of the next first control channel, for example, when it is determined that the control information destined to the terminal device 200 is transmitted in the sub-frames #1 and #5 in the down link, the identification information of the sub-frames #1 and #5 is notified by the first control channel. In the case of employing the TDD, since the control information is transmitted in the sub-frame in the down link, the identification information of the sub-frames notified in the first control channel become identification information of the sub-frame in the down link. Since the sub-frame #0 including the first control channel is also the sub-frame in the down link, the second control channel may be assigned to the sub-frame #0.

Then, the second control channel destined to the terminal device 200 is assigned to the sub-frame in the down link, which is notified to the terminal device 200 by the first control channel. In FIG. 9, the second control channel is represented by a horizontal-line pattern. The second control channel includes control information such as communication parameters used to encode and modulate the data channel of the up link. That is, as in the case of employing the FDD, the second control channel includes the PRB to which the data channel in the up link is assigned. When receiving the second control channel, the terminal device 200 recognizes that transmission of the up data channel is allowed, and transmits the up data channel in the sub-frame of the up frequency following the sub-frame including the second control channel by a predetermined number of sub-frames. In FIG. 9, as represented by a dot pattern, the up data channel is transmitted in the sub-frame following the second control channel by two sub-frames.

As described above, according to this embodiment, the first control channel transmitted at a predetermined cycle notifies the transmission timing of the second control channel transmitted in the cycle, and the second control channel transmits the control information such as communication parameters. For this reason, the frequency of transmission of the control information may be changed by the first control channel to flexibly set communication according to situations.

Embodiment 2

The feature of Embodiment 2 is that the first control channel transmits a portion of the control information to suppress an increase in the overhead caused by the control information.

A configuration of a wireless communication system according to Embodiment 2 is the same as the configuration of the wireless communication system according to Embodiment 1 (FIG. 1) and thus, description thereof is omitted.

Figure 10:
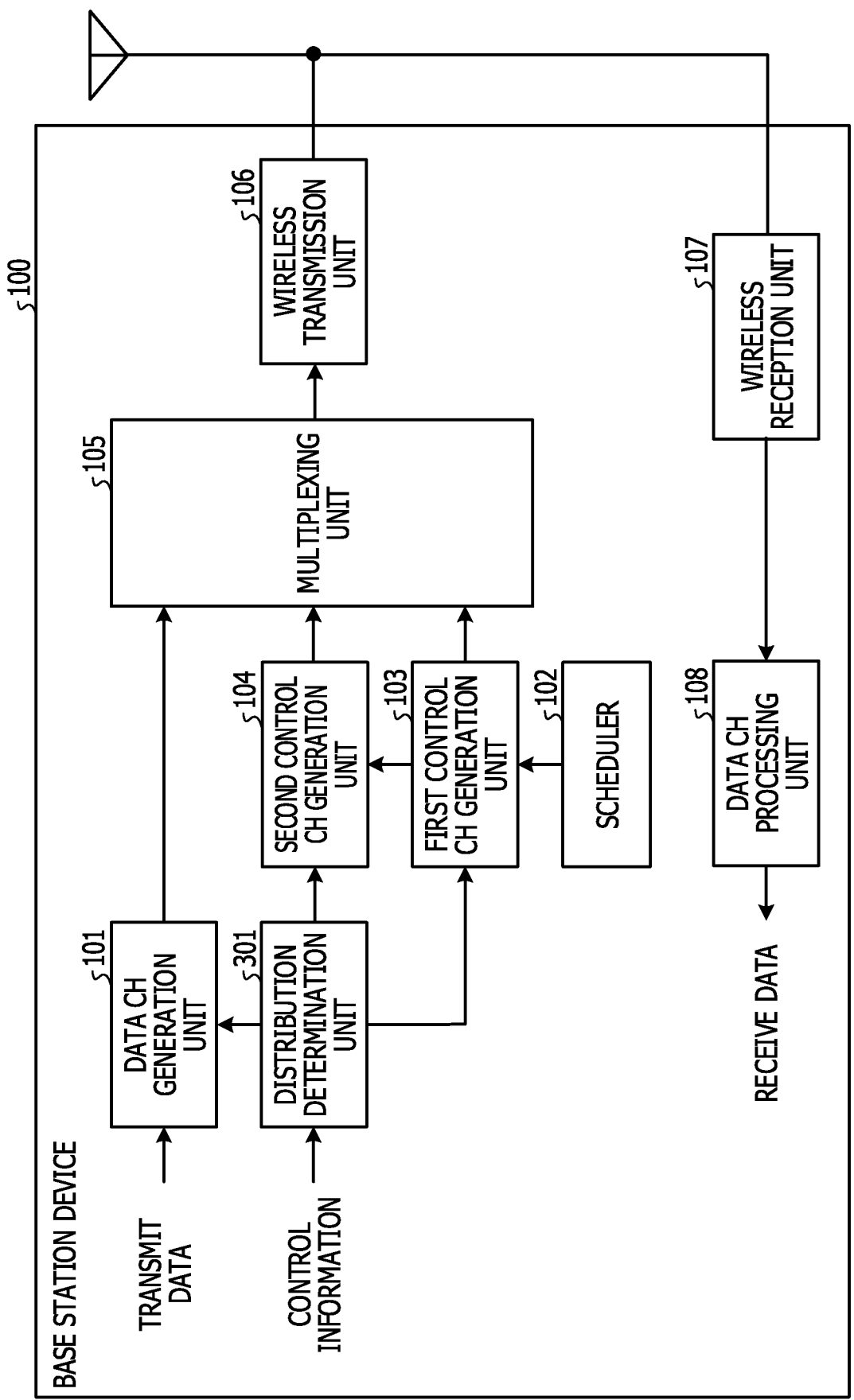
FIG. 10 is a block diagram illustrating a configuration of a base station device according to Embodiment 2.

FIG. 10 is a block diagram illustrating a configuration of a base station device 100 according to Embodiment 2. The same elements in FIG. 10 as those in FIG. 2 are given the same reference numerals and description thereof is omitted. The base station device 100 illustrated in FIG. 10 includes a distribution determination unit 301 in addition to the base station device 100 illustrated in FIG. 2.

The distribution determination unit 301 determines distribution of the control information to the first control channel and the second control channel, and outputs the control information to the first control CH generation unit 103 and the second control CH generation unit 104 according to the determined distribution. At this time, the distribution determination unit 301 may determine the distribution of the control information based on the traffic volume of the base station device 100 and the moving speed of the terminal device 200. For example, when the traffic volume of the base station device 100 is large, the distribution determination unit 301 increases the control information distributed to the first control channel, thereby decreasing the overhead in each sub-frame and increasing the wireless resource assigned to the data channel. For example, when the moving speed of the terminal device 200 is small and a change in the communication parameters of the terminal device 200 is small, the distribution determination unit 301 increases the control information distributed to the first control channel, thereby decreasing the overhead in each sub-frame. Such distribution of the control channel may vary depending on different terminal devices.

The distribution determination unit 301 causes the data CH generation unit 101 to transmit information on the determined distribution of the control information. That is, the distribution determination unit 301 transmits information indicating which control information is distributed to the first control channel, and which control information is distributed to the second control channel via the data CH generation unit 101.

Figure 11:
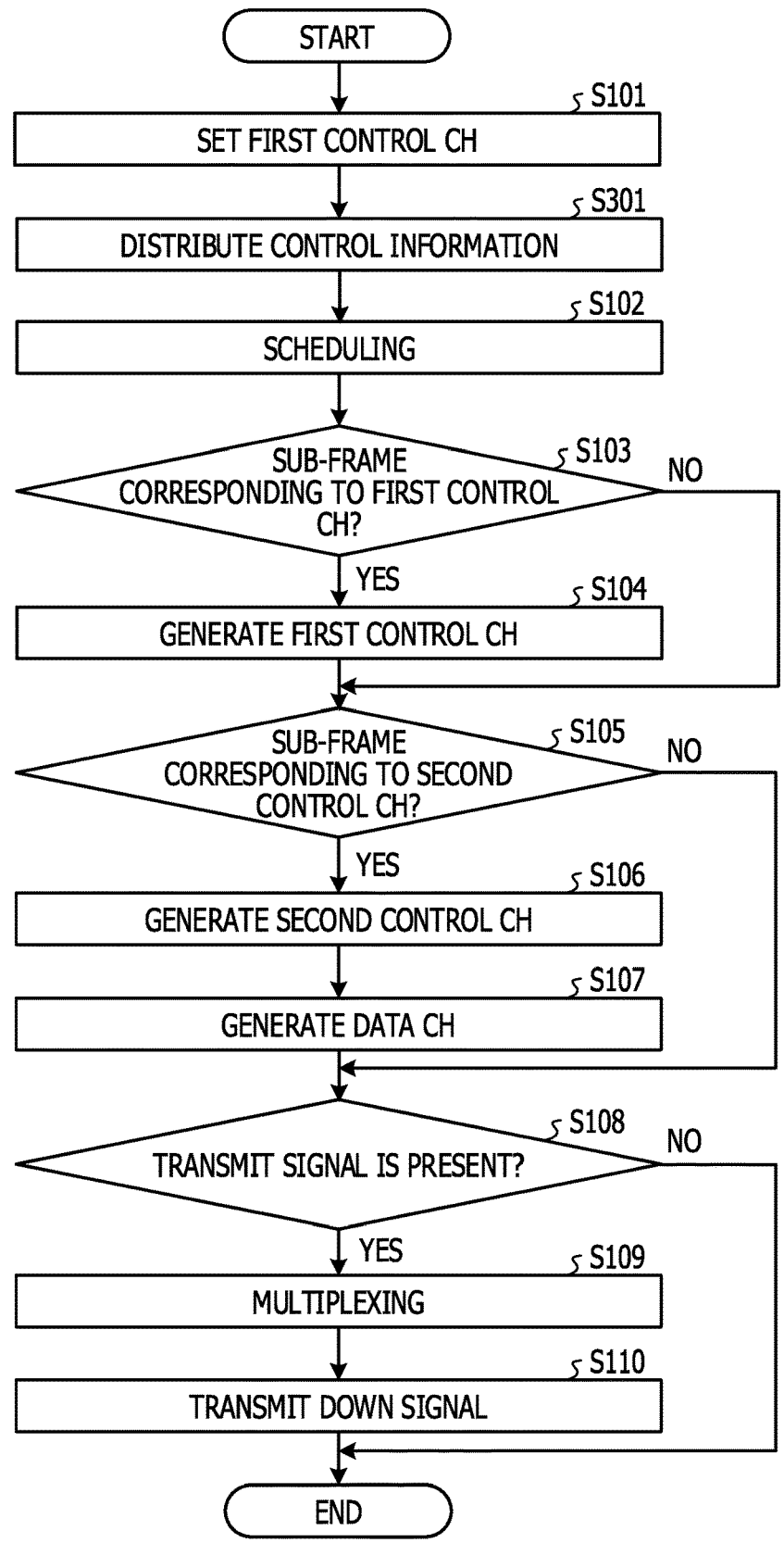
FIG. 11 is a flow chart illustrating control information transmission processing on down data according to Embodiment 2.

Next, referring to a flow chart in FIG. 11, transmission processing of the down control information by the base station device 100 thus configured will be described. The same elements in FIG. 11 as those in FIG. 4 are given the same reference numerals, and detailed description thereof is omitted.

When the base station device 100 starts to communicate with the terminal device 200, a transmission cycle of the first control channel is set (Step S101), and the setting about the first control channel is notified to the terminal device 200 for example, by the RRC signaling. The distribution determination unit 301 determined distribution of the control information to the first control channel and the second control channel, for example, based on the traffic volume of the base station device 100 and the moving speed of the terminal device 200 (Step S301).

Specifically, it is determined to assign, out of the control information, information on the physical resource block (PRB) to which the data channel is assigned, and information on the modulation and coding scheme (MCS) of the data channel to the first control channel, and assign information for identifying new data (NDI) and information on redundancy at encoding (RV) to the second control channel. In this manner, the control information having a small time variation, for example, the information on the PRB and the MCS is distributed to the first control channel, and the control information having a large time variation, for example, the information on the NDI and the RV is distributed to the second control channel. Then, the distribution information of the control information to the first control channel and the second control channel is notified from the data CH generation unit 101 to the terminal device 200 via the multiplexing unit 105 and the wireless transmission unit 106, for example, by the RRC signaling.

In the base station device 100, the scheduler 102 performs scheduling of assigning wireless resources for the down link and the up link to a plurality of terminal devices including the terminal device 200 (Step S102).

Then, the first control CH generation unit 103 determines whether or not the sub-frame corresponding to the preset transmission cycle of the first control channel arrives (Step S103). When it is determined that the sub-frame corresponding to the transmission cycle of the first control channel arrives (Yes in Step S103), the first control CH generation unit 103 identifies the sub-frame in which the control information destined to the terminal device 200 is transmitted, from the scheduling results. Then, the first control CH generation unit 103 generates the first control channel including the identification information of the identified sub-frame and the control information distributed to the first control channel (Step S104). That is, the first control channel including the information on the PRB and the MCS along with the identification information of the sub-frame is generated. On the contrary, when it is determined in Step S103 that the sub-frame corresponding to the transmission cycle of the first control channel does not arrive (No in Step S103), the first control channel is not generated.

Then, the second control CH generation unit 104 determines whether or not the sub-frame corresponding to the identification information included in the first control channel that is transmitted in the current sub-frame or has been transmitted arrives (Step S105). In other words, the second control CH generation unit 104 determines whether or not the sub-frame in which the control information destined to the terminal device 200 is transmitted arrives. When it is determined that the sub-frame to which the control information destined to the terminal device 200 is transmitted arrives (Yes in Step S105), the second control CH generation unit 104 encodes and modulates the control information distributed to the second control channel to generate the second control channel (Step S106). That is, the second control channel including, for example, the NDI and the RV that has not been transmitted by the first control channel is generated. The data CH generation unit 101 encodes and modulates the transmit data destined to the terminal device 200 to generate the down data channel (Step S107).

Through the above-mentioned processing, the sub-frame in which the first control channel, the second control channel, or the data channel is transmitted arrives, a transmit signal including the channel is generated. That is, the multiplexing unit 105 determines whether or not the channel to be transmitted is generated (Step S108), and when it is determined that any one of the channels is not generated (No in Step S108), since it is not the transmission timing for both of the first control channel and the second control channel, the control information is not transmitted. On the contrary, when any one of the channels is generated (Yes in Step S108), at least one of the generated first control channel, second control channel, and data channel is time-multiplexed and frequency-multiplexed by the multiplexing unit 105 (Step S109) to generate the down signal. Then, the wireless transmission unit 106 transmits the down signal including the sub-frame in which at least one of the first control channel, the second control channel, and the data channel is placed, via an antenna (Step S110).

Figure 12:
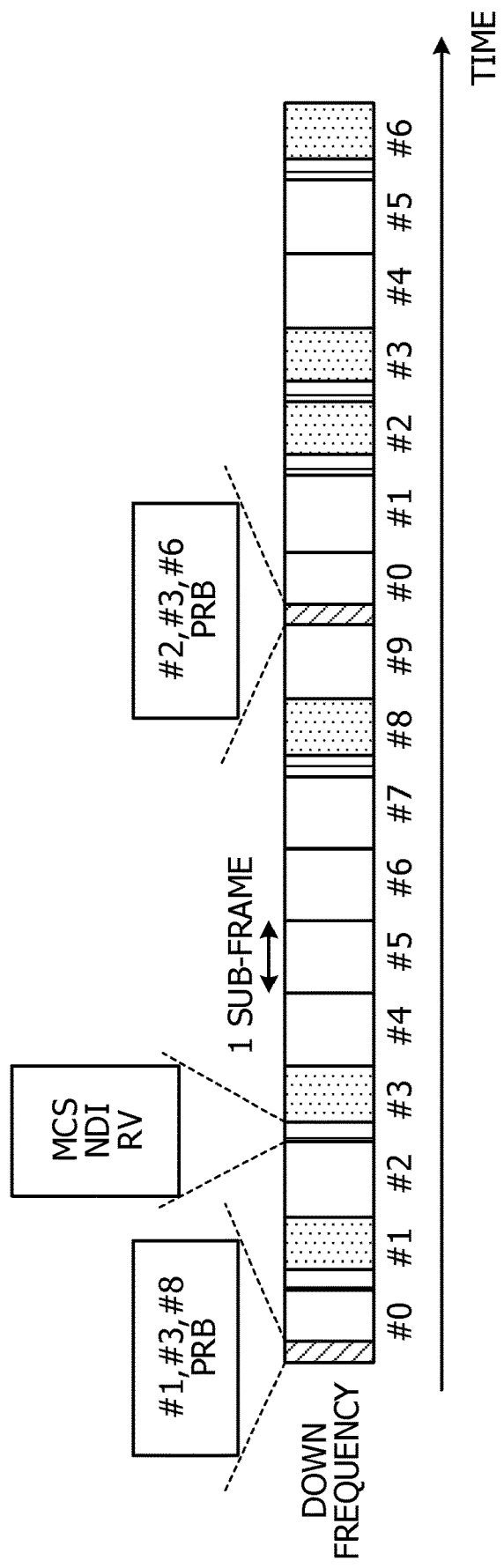
FIG. 12 is a view illustrating a specific example of a configuration of sub-frames in the FDD.

Next, a specific example of a configuration of the sub-frames at the transmission of the down control information will be described. FIG. 12 is a view illustrating the specific example of the configuration of the sub-frames in the FDD. In the FDD, different frequency bands are used depending on the down link and the up link. FIG. 12 illustrates the configuration of the sub-frame for the down link.

As illustrated in FIG. 12, for example, the first control channel is transmitted in the sub-frame #0 at a cycle of 10 sub-frames. That is, the resource block represented by an oblique-line pattern, which is the sub-frame #0 in FIG. 12, is assigned to the first control channel. The first control channel includes the identification information of the sub-frame in which the second control channel including the down control information is transmitted, and the control information distributed to the first control channel by the distribution determination unit 301.

The identification information of the sub-frame, which is included in the first control channel, is determined by the scheduling in the base station device 100. For example, when the scheduling determines that the control information destined to the terminal device 200 is transmitted in the sub-frames #1, #3, and #8, the identification information of the sub-frames #1, #3, and #8 is notified to the terminal device 200 by the first control channel. The control information such as communication parameters that are not changed for a long time is distributed to the first control channel. In FIG. 12, for example, information on the physical resource block (PRB) to which the data channel destined to the terminal device 200 is assigned is distributed to the first control channel.

Then, the second control channel and data channel destined to the terminal device 200 are assigned to the sub-frames notified to the terminal device 200 by the first control channel. In FIG. 12, the second control channel is represented by a horizontal-line pattern, and the data channel is represented by a dot pattern. The second control channel includes the control information distributed to the second control channel by the distribution determination unit 301. That is, the second control channel includes the control information such as communication parameters changed within a short time.

In FIG. 12, information on the modulation and coding scheme (MCS) of the data channel, information for identifying new data and retransmit data (NDI), and information on redundancy at encoding (RV) are distributed to the second control channel.

Figure 13:
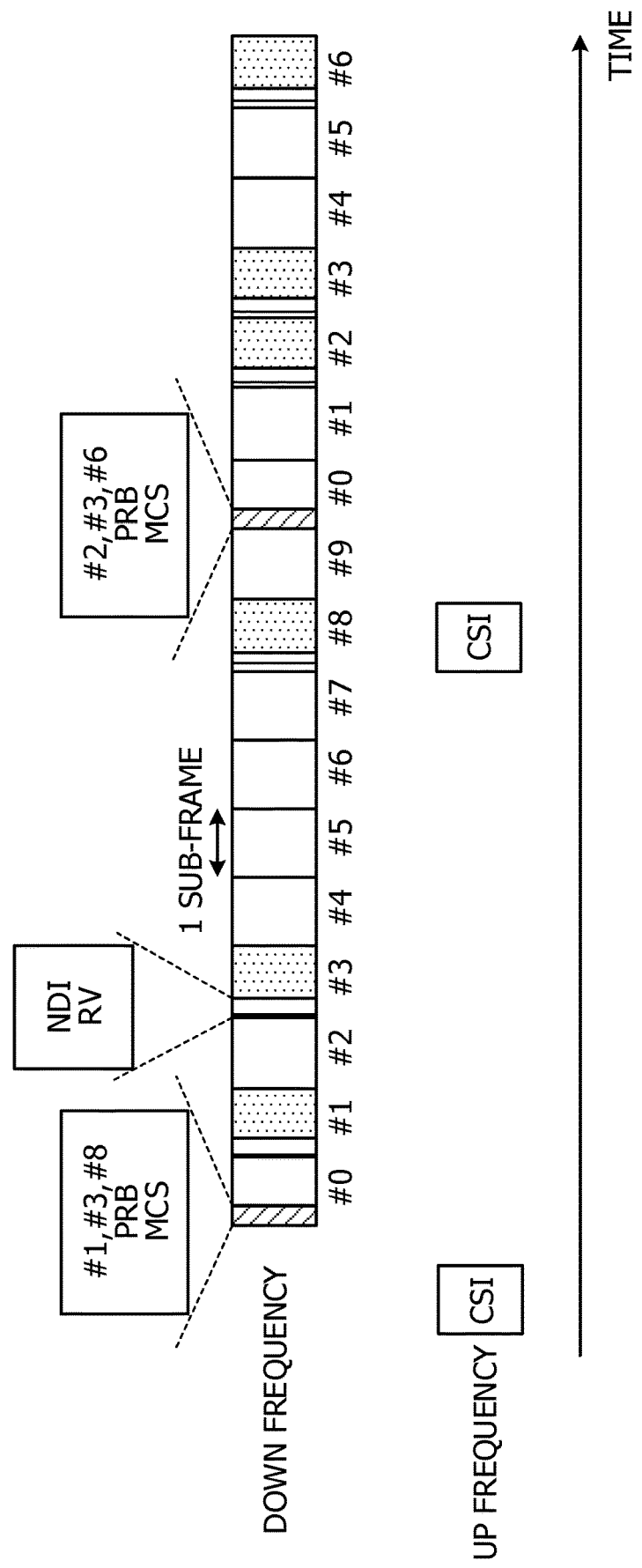
FIG. 13 is a view illustrating a specific example of a configuration of sub-frames in the FDD.

FIG. 13 is a view illustrating another specific example of the configuration of the sub-frames in the FDD. In FIG. 13, the first control channel includes the information on the PRB and the MCS in addition to the sub-frame identification information including the second control channel. Since the MCS is determined based on the channel state information (CSI) reported from the terminal device 200, which indicates the state of the down link, in principle, the MCS is changed at the same cycle as a report cycle of the CSI in the up link. Thus, in the configuration of the sub-frames in FIG. 13, the first control channel is transmitted at the same cycle as the report cycle of the CSI, and the first control channel includes information on the MCS.

As a result, the control information transmitted by the second control channel becomes only the NDI and the RV, further decreasing the overhead in the sub-frames. As illustrated in FIG. 13, even when the report cycle of the CSI is equal to the cycle of the first control channel, information on the MCS may be transmitted by the second control channel. In this case, since the second control channel is transmitted more frequently than the first control channel, the plurality of second control channels may be transmitted before the reception of new CSI. Accordingly, when the MCS is determined based on only the CSI, the same MCS is overlappingly transmitted by the plurality of second control channels.

However, for example, the MCS may be determined using the ACK/NACK that is a reception confirmation response to the down signal, to change the information on the MCS in each second control channel. Specifically, when the ACK indicating reception success is responded to the down signal transmitted to the terminal device 200 last time, information on the MCS corresponding to more superior line quality is transmitted in the next second control channel. On the contrary, when the NACK indicating reception failure is responded to the down signal transmitted to the terminal device 200 last time, information on the MCS corresponding to more inferior line quality is transmitted in the next second control channel. In this manner, the MCS may be changed depending on the line quality in a shorter time than the report cycle of the CSI.

The report cycle of the CSI is not necessarily equal to the transmission cycle of the first control channel, and the cycles may have a predetermined relationship, for example, such that one cycle is an integral multiple of the other cycle.

The specific example of the configuration of the sub-frames in the FDD at the transmission of the down control information has been described. The configuration of the sub-frames is the same of the sub-frames according to Embodiment 1 except that the control information is distributed to the first control channel as well. The configuration of the sub-frames in the TDD and the configuration of the sub-frames at the transmission of the up control information is the same as those in Embodiment 1 except that the control information is distribute to the first control channel as well.

As described above, in this embodiment, the control information is distributed to the first control channel transmitted in a predetermined cycle and the second control channel transmitted in a predetermined cycle, and the first control channel notifies the transmission timing of the second control channel. For this reason, a portion of the control information is transmitted in the first control channel at a longer cycle, and remaining control information is transmitted in the frequently transmitted second control channel, thereby flexibly setting the communication according to situations while suppressing a change in the overhead.

The method of transmitting the first control channel and the second control channel in the above-mentioned embodiments may be applied to self-contained sub-frames. The self-contained sub-frame is one sub-frame including the down signal and the up signal.

Figure 14:
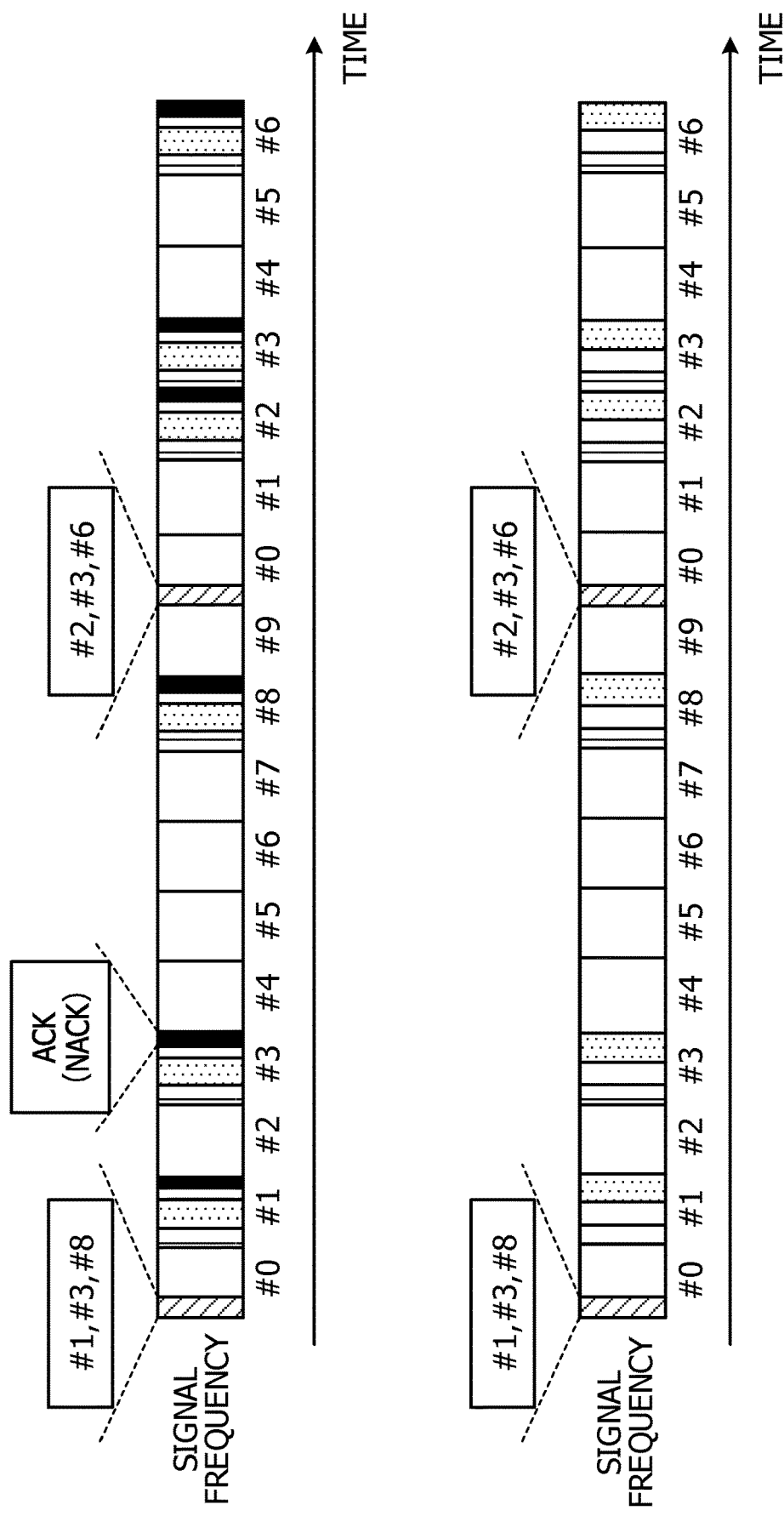
FIG. 14 is a view illustrating a specific example of a configuration of self-contained sub-frames.

FIG. 14 is a view illustrating a specific example of a configuration of the self-contained sub-frames. An upper figure in FIG. 14 illustrates a configuration of sub-frames in the case where the down control information is transmitted in the self-contained sub-frames. As illustrated in the figure, the first control channel is transmitted in the sub-frame #0 at a cycle of 10 sub-frames. In the upper figure in FIG. 14, the sub-frame #0 that is the resource block represented by an oblique-line pattern is assigned to the first control channel. The first control channel includes the identification information of the sub-frame in which the second control channel including the down control information is transmitted.

Then, the second control channel and data channel destined to the terminal device 200 are assigned to the sub-frame notified to the terminal device 200 by the first control channel. In the upper figure in FIG. 14, the second control channel is represented by a horizontal-line pattern, and the data channel is represented by a dot pattern. Further, the ACK/NACK indicating whether or not the reception of the data channel succeeds in the terminal device 200 is included in the sub-frames #1, #3, and #8 including the second control channel. That is, in the same sub-frame as the data channel in the down link, ACK/NACK in the up link, which is represented by a black pattern in the upper figure in FIG. 14 is transmitted.

Similarly, a lower figure in FIG. 14 illustrates a configuration of the sub-frames in the case where the up control information is transmitted in the self-contained sub-frames. As illustrated in the figure, the first control channel is transmitted in the sub-frame #0 at the cycle of 10 sub-frames. That is, the resource block represented by an oblique-line pattern in the sub-frame #0 in FIG. 14 is assigned to the first control channel. The first control channel includes the identification information of the sub-frame in which the second control channel including the up control information is transmitted.

Then, the second control channel for the terminal device 200 is assigned to the sub-frame notified to the terminal device 200 by the first control channel. In the lower figure in FIG. 14, the second control channel is represented by a horizontal-line pattern. Further, the data channel in the up link from the terminal device 200 is included in the sub-frames #1, #3, and #8 including the second control channel. That is, in the sub-frame in which the second control channel in the down link is transmitted, the data channel in the up link, which is represented by a dot pattern in the lower figure in FIG. 14, is transmitted. The data channel in the up link is transmitted according to the communication parameters notified in the second control channel in the same sub-frame.

In this manner, also in the configuration of the self-contained sub-frames, the first control channel can notify the identification information of the sub-frame including the second control channel, flexibly setting the communication according to situations. A portion of the control information may be distributed to the first control channel, decreasing the overhead of the self-contained sub-frame.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless base station device, comprising:
a memory; and
a processor coupled to the memory and configured to
execute a first generation processing that includes generating a first control channel to be placed in a sub-frame at a predetermined cycle, the predetermined cycle based on a total number of sub-frames in the predetermined cycle, the first control channel including information indicating a plurality of sub-frames in the predetermined cycle, wherein the plurality of sub-frames indicated by the information is less than or equal to the total number of sub-frames in the predetermined cycle,
execute a second generation processing that includes generating a second control channel placed in each of the plurality of sub-frames indicated by the information in the first control channel, the second control channel including control information for controlling communication, the control information including at least one communication parameter, wherein a transmission interval of the second control channel is shorter than a transmission interval of the first control channel, and
execute a transmission processing that includes transmitting a sub-frame in which the first control channel is placed and a sub-frame in which the second control channel is placed.

2. The wireless base station device according to claim 1, wherein
the processor is further configured to execute a determination processing that includes determining distribution of the control information to the first control channel and the second control channel,
the first generation processing is configured to generate a first control channel including the control information distributed to the first control channel by the determination processing, and
the second generation processing is configured to generate a second control channel including the control information distributed to the second control channel by the determination processing.

3. The wireless base station device according to claim 2, wherein
the determination processing is configured to determine the distribution of the control information, the distribution varying by terminal device as communication partner.

4. The wireless base station device according to claim 3, wherein
the determination processing is configured to determine the distribution of the control information according to moving speed of the terminal device.

5. The wireless base station device according to claim 2, wherein
the determination processing is configured to distribute control information having a smaller time variation than the control information distributed to the second control channel, to the first control channel.

6. The wireless base station device according to claim 1, wherein when the wireless base station device communicates with a plurality of terminal devices, the first generation processing is configured to place, for each of the plurality of terminal devices, the first control channel in the sub-frame at a cycle corresponding to the each of the plurality of terminal devices.

7. The wireless base station device according to claim 6, wherein
the first generation processing is configured to determine the cycle at which the first control channel is placed according to moving speed of the terminal device.

8. The wireless base station device according to claim 1, wherein
the first generation processing is configured to place the first control channel in the sub-frame at a cycle having a predetermined relationship with a cycle at which a state of a link with a terminal device as a communication partner is acquired.

9. A wireless terminal device comprising:
a memory; and
a processor coupled to the memory and configured to:
execute a reception processing that includes receiving a plurality of sub-frames,
execute a control channel processing that includes:
acquiring information from a first control channel placed in a first sub-frame at a predetermined cycle, the predetermined cycle based on a total number of sub-frames in the predetermined cycle, the information indicating a plurality of sub-frames in the predetermined cycle among the sub-frames received by the reception processing, wherein the plurality of sub-frames indicated by the information is less than or equal to the total number of sub-frames in the predetermined cycle, and
acquiring control information for controlling communication from a second control channel placed in each of the plurality of sub-frames indicated by the information in the first control channel, the second control channel including control information for controlling communication, the control information including at least one communication parameter, wherein a transmission interval of the second control channel is shorter than a transmission interval of the first control channel, and
execute a data channel processing that includes processing a data channel by using the control information acquired by the control channel processing.

10. A wireless communication system comprising:
a base station device; and
a terminal device, wherein
the base station device includes:
a first memory, and
a first processor coupled to the first memory and configured to:
execute a first generation processing that includes generating a first control channel to be placed in a first sub-frame at a predetermined cycle, the predetermined cycle based on a total number of sub-frames in the predetermined cycle, the first control channel including information indicating a plurality of sub-frames in the predetermined cycle, wherein the plurality of sub-frames indicated by the information is less than or equal to the total number of sub-frames in the predetermined cycle,
execute a second generation processing that includes generating a second control channel placed in each of the plurality of sub-frames indicated by the information in the first control channel, the second control channel including control information for controlling communication, the control information including at least one communication parameter, wherein a transmission interval of the second control channel is shorter than a transmission interval of the first control channel, and execute a transmission processing that includes transmitting the first sub-frame in which the first control channel is placed and a sub-frame in which the second control channel is placed, the terminal device includes:

a second memory, and a second processor coupled to the second memory and configured to:

execute a reception processing that includes receiving the sub-frame transmitted by the transmission processing, execute a control channel processing that includes:

acquiring the information from the first control channel placed in the first sub-frame at the predetermined cycle, the predetermined cycle based on a total number of sub-frames in the predetermined cycle, the information indicating the plurality of sub-frames in the predetermined cycle among the sub-frames received by the reception processing, wherein the plurality of sub-frames indicated by the information is less than or equal to the total number of sub-frames in the predetermined cycle, and acquiring the control information from the second control channel placed in each of the plurality of sub-frames indicated by the information in the first control channel, wherein the transmission interval of the second control channel is shorter than the transmission interval of the first control channel, and execute a data channel processing that includes processing a data channel by using the control information acquired by the control channel processing.

11. A wireless communication method implemented by a wireless base station, the wireless communication method comprising:

executing a first generation processing that includes generating a first control channel to be placed in a sub-frame at a predetermined cycle, the predetermined cycle based on a total number of sub-frames in the predetermined cycle, the first control channel including information indicating a plurality of sub-frames in the predetermined cycle, wherein the plurality of sub-frames indicated by the information is less than or equal to the total number of sub-frames in the predetermined cycle, executing a second generation processing that includes generating a second control channel placed in each of the plurality of sub-frames indicated by the information in the first control channel, the second control channel including control information for controlling communication, the control information including at least one communication parameter, wherein a transmission interval of the second control channel is shorter than a transmission interval of the first control channel, and executing a transmission processing that includes transmitting a sub-frame in which the first control channel is placed and a sub-frame in which the second control channel is placed.

* * * * *